No Printed Specification Available
8395X
E. BARNES.
CHEESE PRESS.
Patented Sept. 5, 1834.
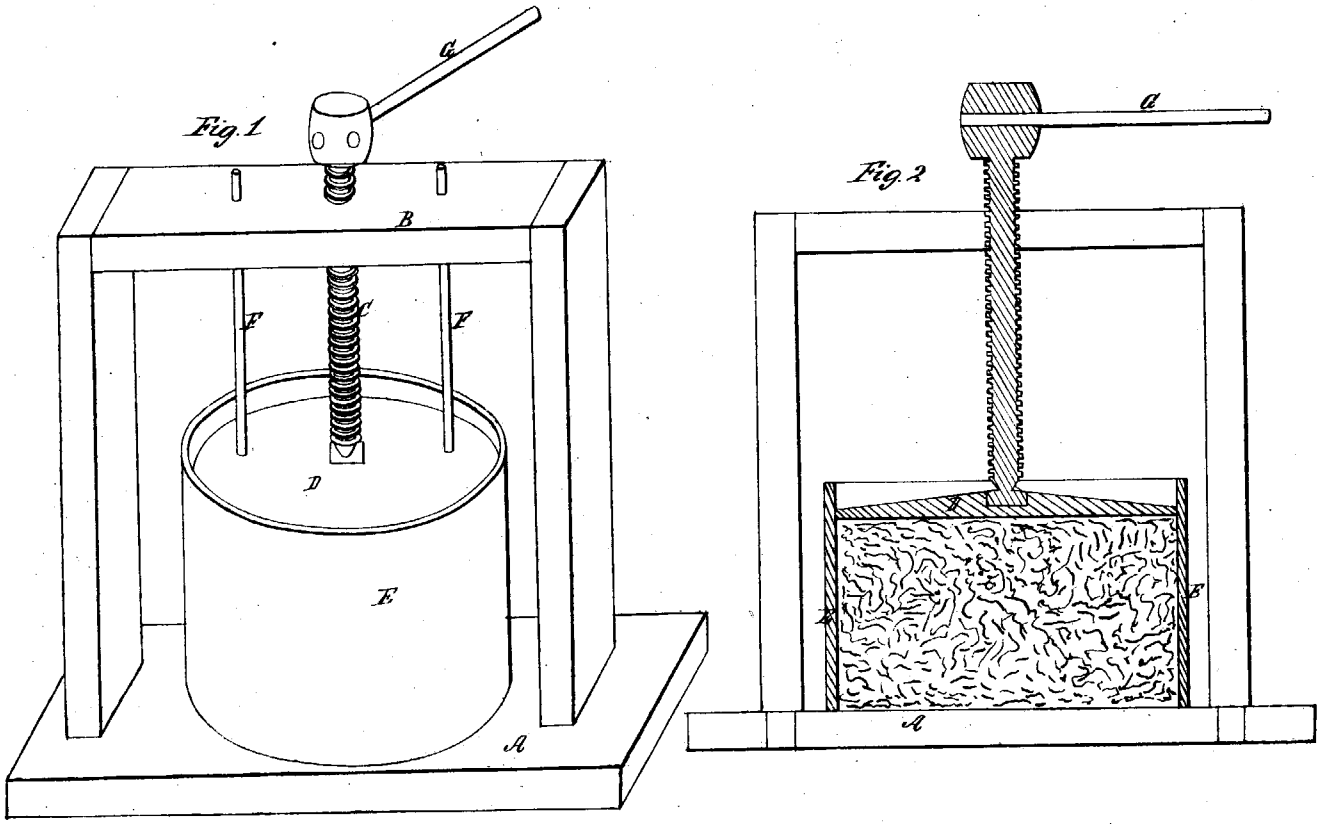

Elijah Barnes North Brookfield Mass

8395X

Letters Patent September 5. 1834.

The Schedule referred to in these Letters Patent and making part of the same Con-
-taining a description in the words of the said Elijah Barnes himself of his im-
provement in pressing Cheese To all to whom these Presents shall come. Be it known that I Elijah Barnes
of North Brookfield in the County of Worcester and State of Massachusetts have
invented a new and useful improvement in pressing Cheese and that the
following is a full and exact description of the Construction and operation of
the said Machine as invented by me.
The size of my Cheese press may be made
as the bigness of the Cheese may require. The utility of my Cheese presses are
considered superior to any other for many reasons. in the first place any
number may be attached to one bench in the second place it goes with one screw
which moves with a guide by turning a handle or when required a lever
can be applied to the hub; and another advantage is the guide which the
screw passes through, and is connected with the head piece, with two
pins so that the screw moves exactly true; the pivot that I bed in the
end of the screw which turns in a box that is bedded in the head piece or
follower that presses upon the Cheese is another advantage by taking off
the friction almost wholly; one more advantage in my presses is this
if the cheese hoop is not very small it will admit of the head piece follow-
-ing in the hoop if the cheese does not fill the hoop. Presses heretofore
in use generally press upon the follower with a beam which causes con-
-siderable trouble in blocking up between the follower and the beam. The
screw presses are considered preferable by experienced dairy people, to
those of the pulley or lever because they are liable to press to hard at first
and consequently forces out the white whey or goodness of the cheese.

Witnesses { Mary Gilbert
Daniel Gilbert } Elijah Barnes 235 words

Drawing